United States Patent [19]

Hoshimi et al.

[11] 4,135,120

[45] Jan. 16, 1979

[54] DRIVE CIRCUIT FOR A BRUSHLESS MOTOR

[75] Inventors: Susumu Hoshimi; Toshio Sato, both of Yokohama, Japan

[73] Assignee: Sony Corporation, Tokyo, Japan

[21] Appl. No.: 868,732

[22] Filed: Jan. 12, 1978

[30] Foreign Application Priority Data

Jan. 20, 1977 [JP] Japan .................................. 52-5232
Jan. 19, 1977 [JP] Japan ............................. 52-4969[U]

[51] Int. Cl.² ............................................ H02K 29/00
[52] U.S. Cl. .................................... 318/138; 318/721; 318/254; 318/722
[58] Field of Search ........................ 318/138, 171, 254

[56] References Cited

U.S. PATENT DOCUMENTS

| | | | |
|---|---|---|---|
| 3,383,574 | 5/1968 | Manteuffel | 318/254 X |
| 3,930,190 | 12/1975 | Liska | 318/254 |
| 3,940,670 | 2/1976 | Tanikoshi | 318/254 |
| 3,999,108 | 12/1976 | Tanikoshi | 318/138 |
| 4,070,606 | 1/1978 | Morozumi et al. | 318/138 X |

*Primary Examiner*—Gene Z. Rubinson
*Attorney, Agent, or Firm*—Lewis H. Eslinger; Alvin Sinderbrand

[57] ABSTRACT

A drive circuit for a brushless motor of the type having a rotor magnet and energizable stator windings. The drive circuit includes position sensors for sensing the rotary position of the rotor magnet and for generating varying position signals corresponding to the sensed rotary position. A plurality of amplifier stages is coupled to the position sensors, the amplifier stages being responsive to the position signals to produce drive currents which are supplied to the stator windings. In one embodiment, each amplifier stage includes a voltage amplifier having a linear gain characteristic for amplifying the position signal applied thereto, a current amplifier connected in cascade with the voltage amplifier and responsive to the amplified position signal to produce a drive current, and a feedback circuit interconnected between the output of the current amplifier and the input to the voltage amplifier, the feedback circuit including a resistor and a capacitor connected in parallel and operative as a low pass filter circuit to prevent harmonics of the drive current frequency from being transmitted to the stator winding, thereby preventing notching in the drive current.

In another embodiment, the drive circuit also includes a speed sensor for sensing the speed of the motor and for generating a signal whose frequency varies in accordance with the motor speed, a converter coupled to the speed sensor for converting the frequency of the generated signal to a voltage, a circuit for applying the converted voltage to the position sensors so as to modify the position signals in accordance with the sensed motor speed, and a circuit for supplying an offset voltage to the last-mentioned circuit such that if the speed of the motor exceeds a predetermined amount, the offset voltage exceeds the converted voltage whereby the resultant voltage which is applied to the position sensors causes a modification in the drive currents supplied to the stator windings, to produce an opposite torque in the motor. In this embodiment, excess motor speeds are rapidly corrected.

11 Claims, 4 Drawing Figures

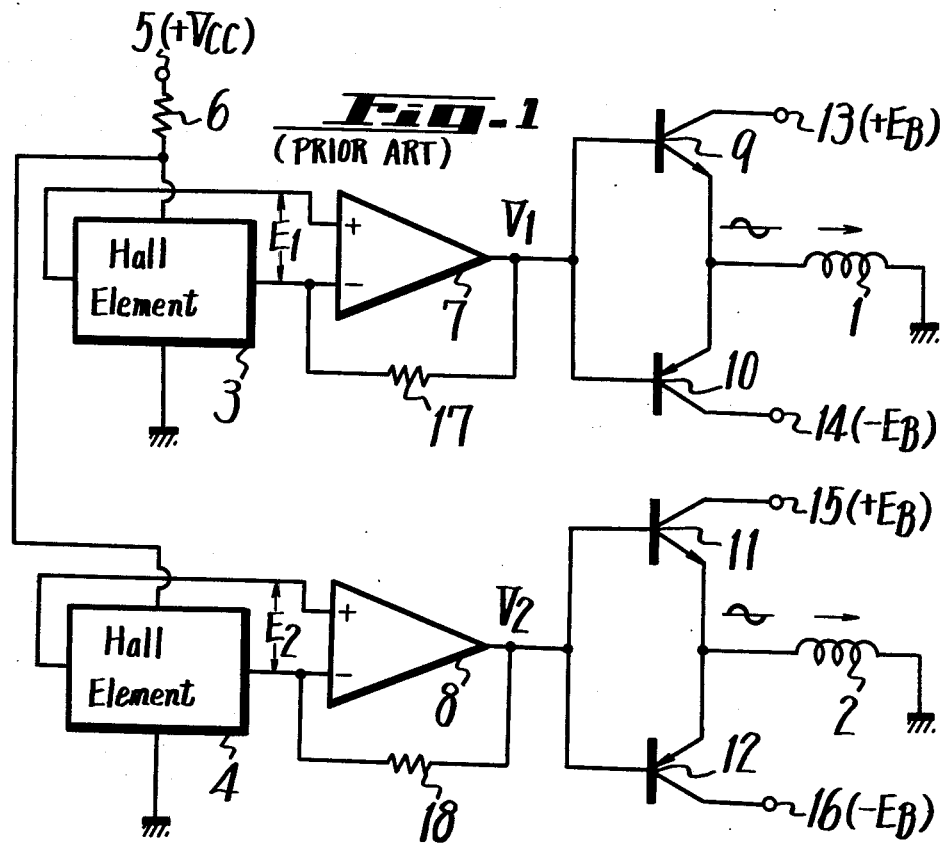
Fig. 1 (PRIOR ART)
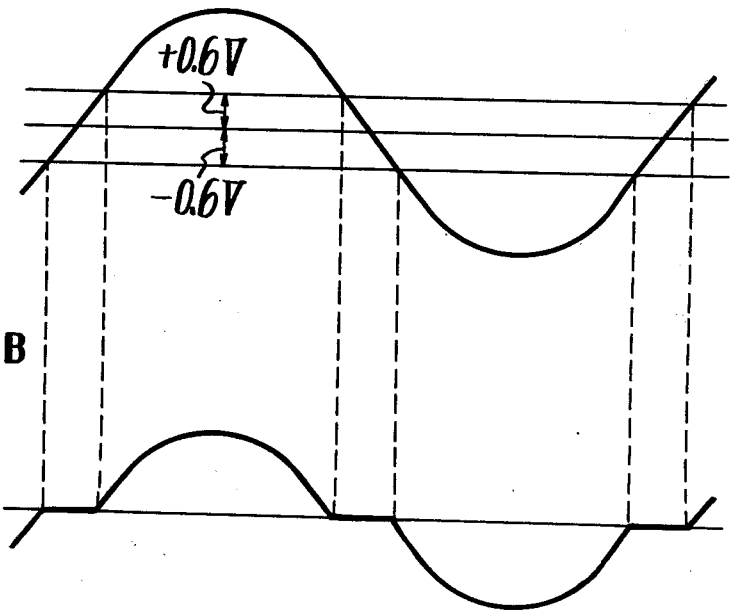
Fig. 2A
Fig. 2B

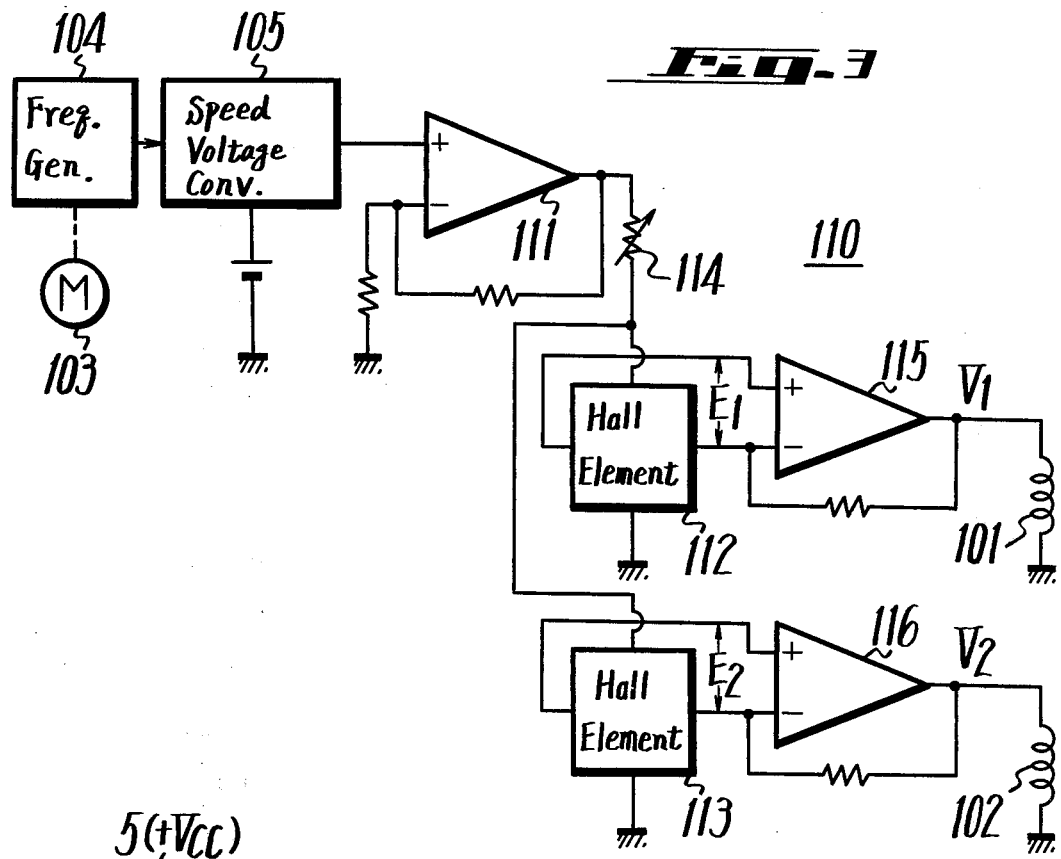
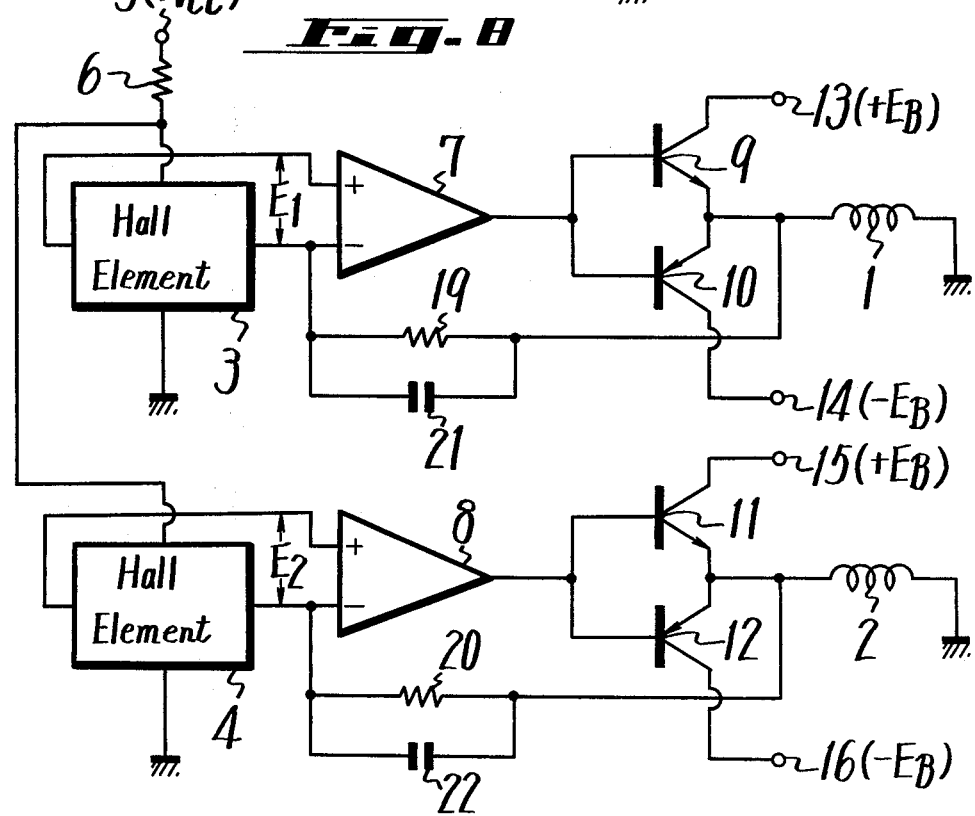

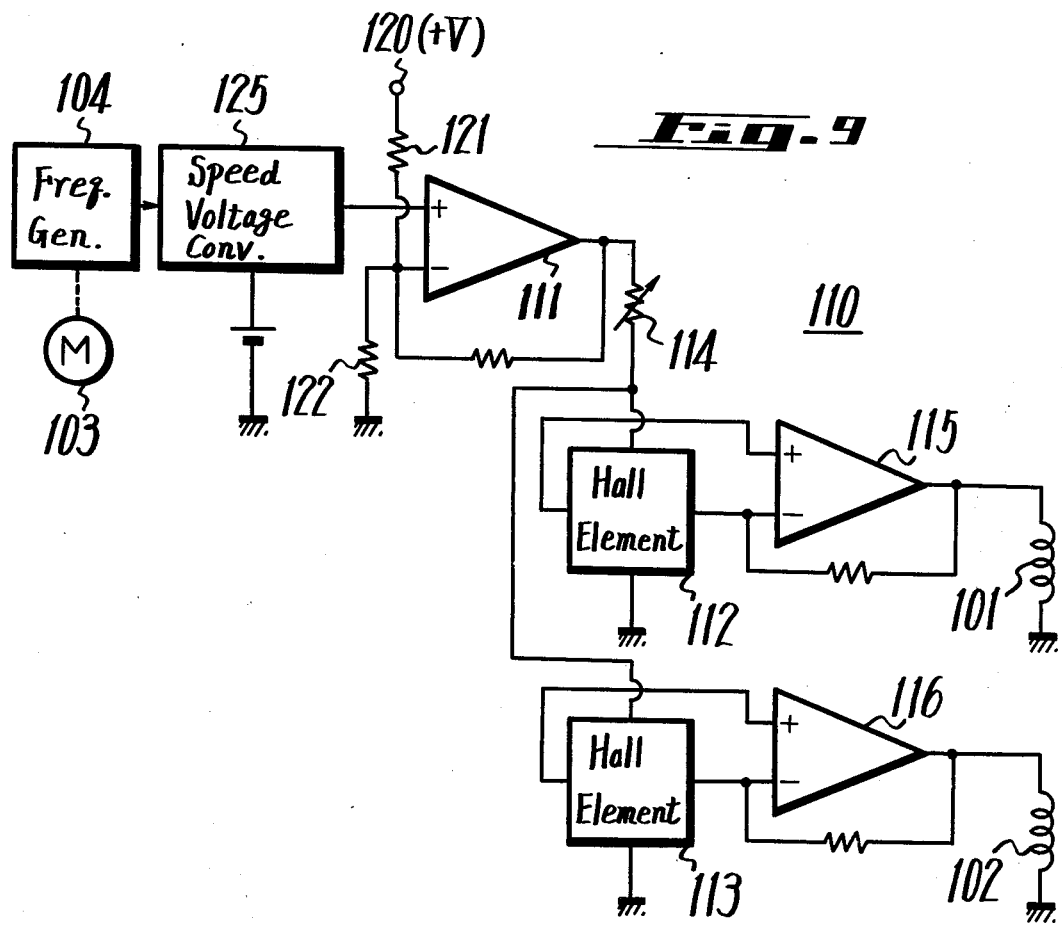
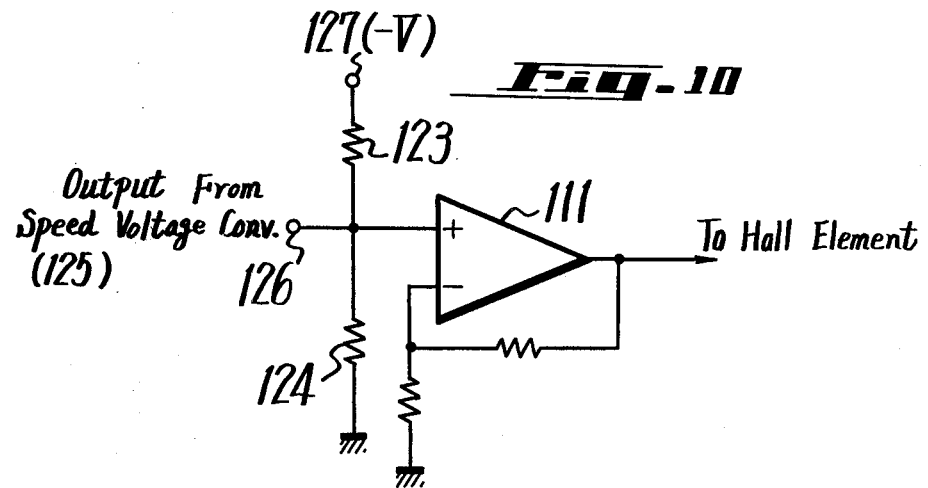

DRIVE CIRCUIT FOR A BRUSHLESS MOTOR

BACKGROUND OF THE INVENTION

This invention relates to a drive circuit for a brushless motor and, more particularly, to an improved drive circuit having a simplified construction and which overcomes certain particular defects attending prior art circuits, such as the so-called notching effect, and which provides rapid and accurate motor speed control.

A brushless motor of the type known to the prior art includes a rotor formed of a permanent magnet and a stator formed of, generally, plural phase windings. In a simplified version, the rotor magnet is a two-pole magnet and the stator windings are formed as a two-phase winding having an electrical angle of 90° between them. The stator windings are selectively energized such that the flux derived therefrom interacts with the flux generated by the permanent magnet rotor so that a force is exerted upon the rotor to cause it to rotate. In this type of brushless motor, the driving circuit therefor is arranged to supply drive currents to the successive stator winding phases as a function of the position of the rotor.

A drive circuit which performs the aforenoted function may include an amplifier and a switching device which are operative to permit drive currents to flow through the corresponding stator phases in proper sequence. The rate at which these drive currents are produced and supplied to the stator windings is a function of rotor speed and rotor position. Accordingly, position sensing elements usually are provided to sense the rotor position and to control the amplifier-switching device combination.

Although various position sensing elements can be used, such as photodetectors, magnetic pickups, and the like, a preferred example is the well-known Hall-effect element. The Hall-effect element, sometimes referred to herein merely as the Hall element, generates an output voltage which is proportional to the magnetic flux density that is applied to that element. As is appreciated, if the Hall element is positioned to sense the flux density generated by the rotor magnet, this flux density varies in a sinusoidal fashion as the rotor rotates so that the output voltage from the Hall element likewise is a sinusoidal signal. If the magnetic flux density generated by the rotor magnet is assumed to be $B_m$ and the instantaneous angle of the rotating rotor is $\theta$, then, in a two-phase stator winding, the flux density $B_1$ which is applied to one phase and the flux density $B_2$ which is applied to the other phase may be expressed as:

$$B_1 = B_m \sin \theta \tag{1}$$

$$B_2 = B_m \cos \theta \tag{2}$$

If two Hall elements are disposed adjacent the respective stator phases, then the output voltages $E_1$ and $E_2$ produced by these Hall elements are proportional to magnetic flux densities $B_1$ and $B_2$, respectively. In a conventional drive circuit, the Hall element output voltages $E_1$ and $E_2$ are supplied to respective amplifier stages which amplify these voltages to produce respective drive currents $i_1$ and $i_2$ which are supplied to associated stator winding phases. These drive currents may be expressed as:

$$i_1 = K \sin \theta \tag{3}$$

$$i_2 = K \cos \theta \tag{4}$$

wherein K is an amplification and proportionality constant.

Now, if the flux density applied to a stator winding is represented as B and the current flowing through that winding is represented as i, then the forces $F_1$ and $F_2$ which are exerted by the respective stator windings may be expressed as:

$$F_1 = i_1 \cdot B_1 = B_m \cdot K \sin^2 \theta \tag{5}$$

$$F_2 = i_2 \cdot B_2 = B_m \cdot K \cos^2 \theta \tag{6}$$

The total force F exerted on the rotor is equal to the sum of the forces exerted by the respective stator windings. Hence, the force exerted on the rotor of a brushless motor is represented as:

$$F = F_1 + F_2 = B_m \cdot K (\sin^2\theta + \cos^2\theta) = B_m \cdot K \tag{7}$$

From equation (7), it is appreciated that the force F exerted on the rotor is a constant irrespective of the angle $\theta$ assumed by that rotor. Hence, the torque also is constant.

In the foregoing explanation, if the amplifier stages associated with the respective stator phases have linear gain characteristics, then K is a constant. Accordingly, in a conventional brushless motor drive circuit, the amplifier stages include such a linear gain amplifier.

In one conventional drive circuit, each amplifier stage includes a voltage amplifier for amplifying the output voltage produced by the Hall element, that is, to amplify the position signal generated by the Hall element, and a current amplifier stage usually formed of complementary transistors connected in a push-pull type configuration. The output from these complementary transistors drives a stator phase. However, in this arrangement, the transistors included in the current amplifier stage are not rendered conductive until the voltages applied thereto exceed the base-emitter bias threshold. Consequently, discontinuities appear in the drive currents supplied to the stator phases because of this non-conduction of the transistors. These discontinuities are known as "notching" in the motor currents. As a result of such notching, an undesirable, audible noise is generated by the motor. As may be appreciated, if the brushless motor is used in conjunction with audio equipment, such as a drive motor in a record turntable of home entertainment apparatus, or as a drive motor for a magnetic tape recorder/player, this noise tends to degrade the overall quality of the apparatus with which the motor is used.

Another type of drive circuit used with a brushless motor is a speed-control circuit wherein a servo loop is used to control the motor speed. In such a drive circuit, Hall elements again may be used to detect the rotor position and to generate position signals which vary as a function of the flux density applied to the Hall elements, and thus as a function of the rotor position. These position signals are amplified and applied to the respective stator phases so as to energize same and thus apply a driving force to the rotor. Speed control is effected by detecting the rotary speed of the motor and by generating a control signal proportional thereto. This control signal then is used to modify the position signals from which the stator phase drive currents are derived in a manner so as to regulate the motor speed. That is, if the speed of the motor exceeds a predetermined amount, the control voltage which is produced as a function of the motor speed tends to decrease the amplitude of the position signals so as to correspondingly decrease the amplitude of the drive currents, thereby decelerating the motor. Conversely, if the motor speed is too low, the control signal tends to increase the amplitude of the position signals so as to correspondingly increase the amplitude of the drive currents and thus accelerate the motor. In this manner, the desired motor speed is maintained.

In an effort to minimize the complexity of the speed-control drive circuit, the control signal generator typically may include a frequency generator driven directly by the motor so as to produce a signal whose frequency varies directly as the motor speed, and a frequency-to-voltage converter to convert the speed representative frequency to a DC voltage. The characteristic of the frequency-to-voltage converter includes a linear portion, and the speed of the motor generally is controlled over a range limited to this linear portion. However, in some instances, the speed of the motor may be such that the proportional control voltage which corresponds thereto is near the end limit of the linear range of this converter. Hence, if the speed of the motor increases to a point which is beyond this range, the control voltage which is produced as a result of this increased speed will bear no relation to the actual speed and, in some instances, may be a zero voltage. This means that the drive currents supplied to the stator phases cannot be controlled in a manner so as to decelerate the motor. That is, a negative torque cannot be produced in the event that the speed of the motor exceeds the limited operative range of the frequency-to-voltage converter. Hence, in the absence of a negative torque, the primary force which is applied to the rotor to decelerate it merely is the frictional force associated with the rotor bearings. Consequently, the motor speed cannot be accurately controlled and, moreover, an inordinate amount of time is required to decelerate the rotor.

OBJECTS OF THE INVENTION

Therefore, it is an object of the present invention to provide improved drive circuits for a brushless motor whereby the aforenoted problems attending prior art drive circuits are avoided.

Another object of this invention is to provide a drive circuit for a brushless motor wherein notching in the drive currents supplied to the stator windings is essentially eliminated.

A further object of this invention is to provide a drive circuit for a brushless motor wherein the speed of the motor can be controlled with both positive and negative torque, while maintaining a relatively simple and economical construction of the drive circuit.

An additional object of this invention is to provide an improved drive circuit for a speed-controlled brushless motor wherein the speed of the motor will be rapidly reduced by exerting a negative torque thereon in the event that the motor speed becomes excessive.

Various other objects, advantages and features of the present invention will become readily apparent from the ensuing detailed description, and the novel features will be particularly pointed out in the appended claims.

SUMMARY OF THE INVENTION

In accordance with this invention, a drive circuit for a brushless motor having a rotor magnet and energizable stator windings is provided, the drive circuit including position sensors for sensing the rotary position of the rotor and for generating varying position signals corresponding to the sensed rotor position and a plurality of amplifier circuits responsive to the position signals to produce and supply drive currents to the stator windings. In one embodiment of the drive circuit, each amplifier circuit includes a voltage amplifier stage having a linear gain characteristic for amplifying the position signal and a current amplifier stage responsive to the amplified position signal to produce the drive current. A feedback circuit is interconnected between the output of the current amplifier stage and an input to the voltage amplifier stage, the feedback circuit including a resistor and a capacitor connected in parallel and operative as a low pass filter circuit to prevent harmonics of the drive current frequency from being transmitted to the stator winding and thus preventing notching in the drive current.

In accordance with another embodiment, the drive circuit is provided with a speed sensor for sensing the motor speed and for generating a signal whose frequency varies in accordance with such motor speed, and a converter for converting the frequency of the speed sensing signal to a voltage, the converter having a linear characteristic representing an inverse relation between frequency and voltage. The voltage produced by the converter is used to modify the drive currents supplied to the stator windings by the amplifier circuits as a function of the sensed motor speed. An offset voltage is combined with the speed representing voltage such that if the motor speed exceeds a predetermined amount, the offset voltage will exceed the speed representing voltage such that the modified drive currents which are supplied to the stator windings result in an opposite torque in the motor.

BRIEF DESCRIPTION OF THE DRAWINGS

The following detailed description, given by way of example, will best be understood in conjunction with the accompanying drawings in which:

FIG. 1 is a schematic diagram of a prior art drive circuit;

FIGS. 2A and 2B are waveform diagrams which are useful in explaining the operation of the prior art circuit shown in FIG. 1;

FIG. 3 is a partial block, partial schematic diagram of another prior art drive circuit for a brushless motor;

FIG. 8 is a schematic diagram of one embodiment of the present invention;

FIG. 9 is a partial block, partial schematic diagram of another embodiment of the present invention; and FIG. 10 is a schematic diagram of an alternative embodiment of a component used in the circuit shown in FIG. 9.

DETAILED DESCRIPTION OF SOME OF THE PREFERRED EMBODIMENTS

Figure 4:
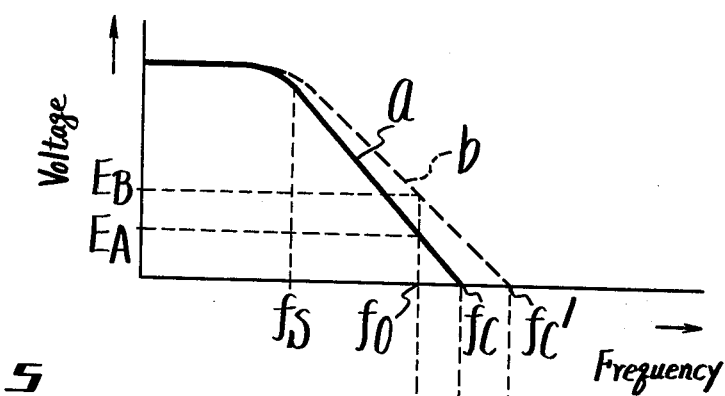
FIG. 4 represents the frequency/voltage characteristic of one of the components used in the circuit of FIG. 3.

Before describing the present invention, typical examples of prior art drive circuits for brushless motors will be discussed, and certain attendant disadvantages therein will be pointed out. Referring now to FIG. 1, one example of a prior art drive circuit is shown wherein drive currents are supplied to stator phases 1 and 2 in accordance with the sensed rotary position of the rotor (not shown). In the interest of simplification, it will be assumed that the rotor is a two-pole magnetic rotor and that the stator windings are comprised of two phases which exhibit an electrical angle of 90° therebetween. Hence, equations (1)–(7), above, are applicable to the drive circuit shown in FIG. 1.

The illustrated drive circuit is adapted to sense the rotary position of the rotor and to generate position signals in accordance therewith, these position signals being used to derive the drive currents which are supplied to stator phases 1 and 2. An example of position sensors which can be used with the drive circuit are conventional Hall elements 3 and 4. In a typical Hall element, current flows through the element in a given direction, and when a magnetic field is applied in a direction perpendicular to the current flow, the element produces a voltage which is proportional to the magnetic flux density that is applied to the Hall element in a direction perpendicular both to the current and to the magnetic field. Current through Hall elements 3 and 4 is derived from a DC voltage source 5, to which a supply voltage $+V_{cc}$ is applied, and a resistor 6. As shown, source 5 and resistor 6 are connected in series with each of Hall elements 3 and 4 to supply currents thereto. Preferably, such supply currents are equal.

An amplifier 7, such as an operational amplifier having inverting and non-inverting inputs, is coupled to Hall element 3. A similar amplifier 8 is coupled to Hall element 4. The respective voltages produced by the Hall elements are applied across the inverting and non-inverting inputs of amplifiers 7 and 8, respectively. Amplifiers 7 and 8 may be differential amplifiers. Amplifier 7 is provided with a feedback resistor 17 between its output and its inverting input. Similarly, amplifier 8 is provided with a feedback resistor between its output and its inverting input.

Amplifier 7 is used to derive the drive current for stator phase 1, while amplifier 8 is used to derive the drive current for stator phase 2. In this regard, complementary transistors 9 and 10 have their emitter electrodes connected in common to stator phase 1 and their base electrodes connected in common to the output of amplifier 7. Similarly, complementary transistors 11 and 12 are provided with their emitter electrodes connected in common to stator phase 2 and their base electrodes connected in common to the output of amplifier 8. Transistor 9 is an NPN transistor whose collector electrode is connected to a source 13 of energizing voltage $+E_B$, and transistor 10 is a PNP transistor whose collector electrode is connected to a source 14 of energizing voltage $-E_B$. In a similar manner, transistor 11 is an NPN transistor whose collector electrode is connected to a source 15 of energizing voltage $+E_B$, and transistor 12 is a PNP transistor whose collector electrode is connected to a source 16 of energizing voltage $-E_B$. The respective energizing voltages may be derived from a single, conventional power supply, and the collector electrodes of the NPN transistors may be connected in common, and the collector electrodes of the PNP transistors likewise may be connected in common.

From equations (1) and (2) above, it is seen that the magnetic flux densities applied to Hall elements 3 and 4 vary sinusoidally as the rotor of the brushless motor rotates. Since the currents through the Hall elements derived from source 5 have been assumed to be constant, output voltages $E_1$ and $E_2$ produced by Hall elements 3 and 4, respectively, vary in a sinusoidal manner in accordance with the respective flux densities. With reference to amplifier 7, if the amplified voltage produced thereby is represented as $V_1$, and if the resistance of resistor 17 is represented as $R_{NF}$, and if the effective impedance of Hall element 3 as viewed from the inverting and non-inverting inputs, respectively, of amplifier 7 is represented as $R_i$, then voltage $V_1$ may be expressed as:

$$V_1 = (R_i + R_{NF}/R_i) \cdot E_1 \tag{8}$$

If the foregoing also is applied to amplifier 8, then its amplified output voltage $V_2$ may be expressed as:

$$V_2 = (R_i + R_{NF}/R_i) \cdot E_2 \tag{9}$$

$E_1$ and $E_2$ are sinusoidally varying position signals representing the instantaneous position of the rotor. From equations (8) and (9), it is appreciated that amplified voltages $V_1$ and $V_2$ likewise are sinusoidal. A typical waveform of voltage $V_1$, for example, is shown in FIG. 2A. This voltage is supplied to the current amplifier stage formed of transistors 9 and 10. Likewise, voltage $V_2$ is applied to the current amplifier stage formed of transistors 11 and 12. With respect to transistors 9 and 10, since transistor 9 is an NPN transistor, it is rendered conductive during the positive half-cycle of the waveform shown in FIG. 2A; while PNP transistor 10 is rendered conductive during the negative half-cycle of this waveform. However, transistor 9 does not conduct until voltage $V_1$ exceeds the base-emitter bias voltage thereof. A typical value of the base-emitter voltage for an NPN transistor is approximately 0.6 volts. Thus, transistor 9 is not rendered conductive until voltage $V_1$ is equal to 0.6 volts, and then the current produced by transistor 9 follows the voltage supplied thereto, as shown by the waveform of FIG. 2B. Similarly, the base-emitter bias voltage of PNP transistor 10 is approximately $-0.6$ volts, and this transistor is not rendered conductive until voltage $V_1$ is equal to $-0.6$ volts. The current produced by transistor 10 which flows through stator phase 1 follows voltage $V_1$ once the base-emitter bias threshold is exceeded. Consequently, the drive current through stator phase 1 exhibits the waveform shown in FIG. 2B. It is appreciated that transistors 9 and 10 are rendered conductive alternatively. Because neither transistor conducts current when voltage $V_1$ is between $-0.6$ volts and $+0.6$ volts, the drive current through stator phase 1 exhibits a discontinuity when voltage $V_1$ is in this range, as shown by the waveform of FIG. 2B. This discontinuity is the so-called notching effect and, as mentioned previously, results in an undesired noise generated by the motor.

In the interest of brevity, a detailed description of the drive current produced by transistors 11 and 12 and supplied to stator phase 2 is not presented. However, it will be recognized that the drive current through stator phase 2 exhibits a waveform similar to that shown in FIG. 2B, and thus includes undesired notching.

In the embodiment of the present invention shown in the schematic diagram of FIG. 8, this notching effect is eliminated. However, before proceeding with a discussion of the embodiment shown in FIG. 8, another prior art drive circuit will be described with reference to FIG. 3.

The prior art drive circuit 110 shown in FIG. 3 includes a servo loop for controlling the speed of the motor to be equal to a desired speed. In the interest of simplification, a current amplifier stage is not shown in this circuit. This is not to mean that such a stage is not used; and the attendant problem of notching, as discussed above, may be present in drive circuit 110. This drive circuit is similar to that shown in FIG. 1 in that Hall elements 112 and 113 are provided as rotor position sensors. The outputs of these Hall elements are coupled to amplifiers 115 and 116, respectively, and supply these amplifiers with position signals $E_1$ and $E_2$ which, as mentioned above, are sinusoidal and represent the instantaneous position of the rotor. Amplifiers 115 and 116 produce amplified voltages $V_1$ and $V_2$, respectively, from which drive currents are supplied to stator phases 101 and 102.

FIG. 3 differs from FIG. 1 in that the currents through Hall elements 112 and 113 are not necessarily constant, as are the currents through Hall elements 3 and 4 (FIG. 1). Rather, Hall elements 112 and 113 are connected in common to an adjustable resistor 114 which, in turn, is supplied with a control voltage that represents the actual speed of the motor. By varying the currents through the Hall elements, position signals $E_1$ and $E_2$ are correspondingly varied. Thus, if the Hall element currents are varied as a function of motor speed, position signals $E_1$ and $E_2$ likewise vary as a function of motor speed so as to correspondingly adjust the drive current through stator phases 101 and 102. That is, a change in the speed representing voltage varies the drive currents as a function of motor speed.

The circuit used to generate the speed representing voltage is comprised of a frequency generator 104, a frequency-to-speed converter 105 and an amplifier 111. Frequency generator 104 may comprise a simple tachometer device, such as an optical sensor, a magnetic pickup, or the like, and is mechanically coupled to motor 103 so as to produce an output signal whose frequency varies directly as the speed of the motor. As an example of an optical device, the rotor shaft of motor 103 may be provided with an indicium, or may be coupled to a chopper wheel, the rotation of the indicium or chopper wheel being detected by a photodetector to produce an output signal whose frequency is directly proportional to motor speed. As an example of a magnetic pickup device, a magnetic element may be provided on the rotor shaft and a sensing coil may be fixedly disposed so as to produce an output signal whenever the magnetic element is sensed. Of course, other arrangements are contemplated for frequency generator 104.

Frequency-to-speed converter 105 is adapted to produce a DC voltage whose magnitude varies inversely as the frequency of the signal produced by frequency generator 104. That is, the voltage produced by converter 105 is inversely proportional to the speed of motor 103. As an example, converter 105 may comprise a low pass filtering device whose frequency/voltage characteristic has a linear portion. Typically, if the frequency of the signals supplied to converter 105 exceeds a predetermined threshold, the voltage produced by the converter remains at zero volts regardless of this excess frequency. An illustration of the frequency-voltage characteristic of converter 105 is represented by the solid curve shown in FIG. 4. Thus, if the frequency of the signal supplied to converter 105 exceeds $f_c$, the output voltage produced by the converter becomes zero. As also shown in FIG. 4, the linear portion of the frequency/voltage characteristic of converter 105 is limited to the frequency range $(f_c - f_s)$.

Amplifier 111 may comprise an operational amplifier or a differential amplifier having inverting and non-inverting inputs, respectively. As shown in FIG. 3, the non-inverting input of amplifier 111 is coupled to converter 105, and a feedback circuit is provided between the output of amplifier 111 and its inverting input. Thus, amplifier 111 functions to amplify the voltage produced by converter 105, resulting in an output speed representing voltage which, in turn, is used to determine the currents through Hall elements 112 and 113. Thus, position signals $E_1$ and $E_2$ are determined by magnetic flux densities $B_1$ and $B_2$ (represented by equations (1) and (2) above), and currents $i_0$ which are supplied to the Hall elements by amplifier 111 and which are a function of sensed motor speed. The position signals may, therefore, be expressed as:

$$E_1 = K \cdot i_0 \cdot B_1 \quad (10)$$

$$E_2 = K \cdot i_0 \cdot B_2 \quad (11)$$

wherein K represents the Hall coefficient and the linear gain of amplifier 111.

The manner in which the drive circuit shown in FIG. 3 controls the speed of motor 103 now will be described with reference to the characteristics shown in FIGS. 4 and 5. Let it be assumed that the load which is coupled to the motor, taken with the load presented by the motor itself requires a torque $T_L$ for rotation at the angular velocity $\omega_0$. The rotation of motor 103 at the speed $\omega_0$ results in a frequency $f_0$ in the signal produced by frequency generator 104. As can be seen from characteristic a in FIG. 4, converter 105 produces an output voltage $E_A$ corresponding to frequency $f_0$ which, in turn, corresponds to motor speed $\omega_0$. It is this voltage $E_A$ which is amplified by amplifier 111 to establish the current $i_0$ through Hall elements 112 and 113. From equations (10) and (11), it is seen that position signals $E_1$ and $E_2$, which are proportional to current $i_0$, are determined, at least in part, by motor speed $\omega_0$. The drive currents supplied to stator phases 101 and 102 thus are a function of voltage $E_A$, and thus drive motor 103 at speed $\omega_0$. Stated otherwise, voltage $E_A$ which is produced by converter 105 establishes the desired torque $T_L$ to drive motor 103. If the speed of motor 103 decreases, the frequency of the signal generated by frequency generator 104 likewise decreases, whereupon the voltage produced by converter 105 increases above the value $E_A$. This increase in the voltage produced by converter 105 correspondingly increases the currents through Hall elements 112 and 113, resulting in an increase in the amplitudes of position signals $E_1$ and $E_2$. Hence, the drive currents through stator phases 101 and 102 likewise increase, whereby the speed of motor 103 is returned to its desired speed $\omega_0$. Conversely, if the speed of the motor increases, the frequency of the signal generated by frequency generator 104 correspondingly increases, resulting in a decrease in the voltage produced by converter 105, as is apparent from the characteristic shown in FIG. 4. Hence, the currents through Hall elements 112 and 113 are reduced so as to reduce the amplitudes of position signals $E_1$ and $E_2$. This results in a decrease in the drive currents supplied to stator phases 101 and 102, whereby the speed of motor 103 returns to its desired speed $\omega_0$.

Figure 5:
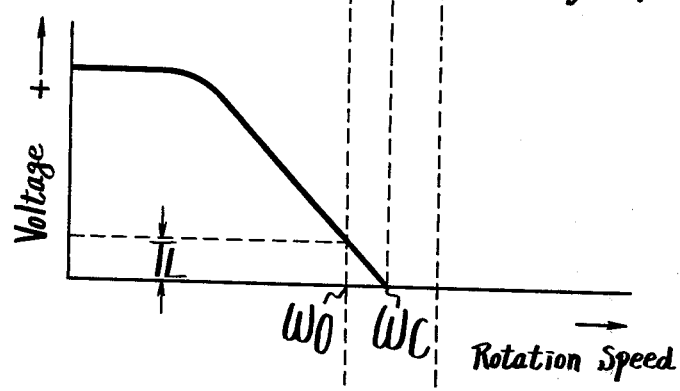
FIG. 5 represents the relation between control voltage and motor speed, and is useful in understanding the operation of the circuit shown in FIG. 3.

The characteristic shown in FIG. 5 resembles the characteristic of FIG. 4 and represents the relation between the angular velocity $\omega$ of motor 103 and the voltage produced by converter 105. If motor 103 is used to drive a record turntable, for example, the load exerted thereby on the motor is relatively small. Hence, a correspondingly low torque $T_L$ must be produced by the motor. From the foregoing, it is seen that the voltage produced by converter 105 is, at least in part, determinative of the motor torque. Hence, for a relatively small load exerted on motor 103, the voltage which is needed to derive that torque also is low. Thus, if motor 103 is driven at speed $\omega_0$, as assumed above, and if the motor torque needed for driving the motor at this speed also is low, then, as shown in FIG. 5, a relatively low voltage is produced by converter 105. These parameters combine such that the voltage produced by the converter is close to its limit along the linear portion of its frequency/voltage characteristic. Hence, the range over which motor 103 can be controlled linearly and accurately is constrained. As is recognized, if motor 103 is to operate at speed $\omega_0$, an undesired increase in motor speed which exceeds $\omega_c$ will result in a voltage produced by converter 105 of zero volts. When this occurs, motor speed cannot be controlled directly.

Figure 7:
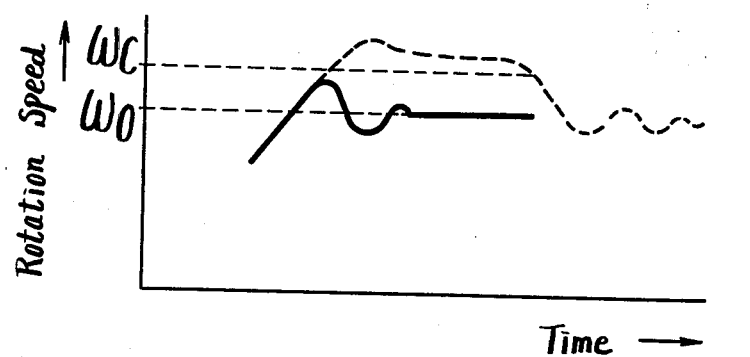
FIG. 7 is a waveform diagram representing the manner in which motor speed is controlled.

The foregoing problem is graphically depicted in FIG. 7 wherein the ordinate represents motor speed and the abscissa represents time. If the motor is rotating at a speed less than $\omega_c$, and if the desired speed is set at $\omega_0$, the drive circuit shown in FIG. 3 will control motor 103 such that the desired speed $\omega_0$ is attained rapidly. For example, if motor 103 is used to drive a record turntable, and if the motor speed is changed from 45 rpm to 33⅓ rpm, then this change will be effected in a short period of time, as depicted by the solid curve of FIG. 7. However, let it be assumed that, at the time of changing the motor speed from 45 rpm to 33⅓ rpm, the motor speed exceeds $\omega_c$. Since the speed of motor 103 is greater than $\omega_c$, the voltage produced by converter 105 is equal to zero (FIGS. 4 and 5). This means that a suitable controlling torque is not produced by the motor. That is, with the circuit shown in FIG. 3, only a positive motor torque can be produced. Since a negative torque is required to decelerate the motor from its present speed, which exceeds $\omega_c$, to its desired speed $\omega_0$, such a torque-controlled deceleration is not possible. Rather, the principal forces which are exerted on the rotor to reduce its speed from greater than $\omega_c$ to $\omega_0$ are the frictional forces developed by the rotor bearings. As may be appreciated, and as shown in FIG. 7, these frictional forces require a substantial period of time to decelerate the motor to a speed which is within the controlling range ($>\omega_c$) represented by the characteristics and waveforms shown in FIGS. 4, 5 and 7, respectively. Thus, overshoots in the speed control system which may arise from an abrupt selection in the motor speed (e.g. a change of the motor speed from 45 rpm to 33⅓ rpm), will be compensated rapidly if this overshoot does not exceed the control range of converter 105 (i.e. $\omega_c$); but will not be compensated if this overshoot exceeds $\omega_c$.

The problems attending the prior art drive circuits shown in FIGS. 1 and 3 are overcome by the embodiments of the present invention now to be described. Referring first to the drive circuit shown schematically in FIG. 8, this circuit avoids the notching effect in the drive currents supplied to stator phases 1 and 2. The drive circuit shown in FIG. 8 is similar to that shown in FIG. 1, except that a negative feedback circuit is provided in FIG. 8, this negative feedback circuit being connected between the output of current amplifier transistors 9 and 10 and the inverting input of amplifier 7, and another feedback circuit connected between the output of current amplifier transistors 11 and 12 and the inverting input of amplifier 8. This feedback circuit is comprised of a resistor and a capacitor connected in parallel configuration. Thus, in the amplifier stage used to energize stator phase 1, the common-connected emitter electrodes of transistors 9 and 10 are connected via parallel-connected resistor 19 and capacitor 21 to the inverting input of amplifier 7. Similarly, the common-connected emitter electrodes of transistors 11 and 12 are connected via parallel-connected resistor 20 and capacitor 22 to the inverting input of amplifier 8.

The parallel connection of, for example, resistor 19 and capacitor 21 functions as a low pass filter circuit. That is, the amplifier circuit formed of amplifier 7 and transistors 9 and 10 when provided with resistor 19 and capacitor 21 in the manner shown in FIG. 8, are responsive only to relatively lower frequency signals. Similarly, amplifier 8 and transistors 11 and 12 are responsive only to relatively lower frequency signals. In particular, if the resistance of each of resistors 19 and 20 is represented as $R'_{NF}$, and if the capacitance of each of capacitors 21 and 22 is represented as C, then the maximum cut-off frequency f for each of the low pass amplifier circuits shown in FIG. 8 may be expressed as:

$$f_c = (1/2\pi R'_{NF}C) \tag{12}$$

The reason why the circuit configuration shown in FIG. 8 eliminates the notching effect in the drive currents supplied to the stator windings now will be explained. The discontinuity in the stator drive currents produced by the prior art circuit of FIG. 1, when subjected to Fourier analysis, consists of a summation of the odd harmonics of the fundamental frequency $f_a$, where $f_a$ is the frequency of the sinusoidal voltages $V_1$ and $V_2$, respectively. If the cut-off frequency represented by equation (12) is less than the third harmonic ($3f_a$), then the odd harmonics included in the amplified voltages are blocked by the low pass filtering operation performed by the parallel-connected resistor and capacitor. Thus, only the fundamental frequency $f_a$ passes through the respective amplifier circuits, resulting in a smooth, continuous current waveform in the drive currents supplied to stator phases 1 and 2. Consequently, the notching effect attending the prior art circuit of FIG. 1 is eliminated from the drive circuit shown in FIG. 8.

Referring now to the problem caused by an excessive overshoot in the motor speed of motor 103 controlled by the drive circuit shown in FIG. 3, this problem is solved in accordance with the embodiment of the drive circuit shown in FIG. 9. The embodiment of FIG. 9 is similar to that described hereinabove with respect to FIG. 3 except that amplifier 111 is provided with an offset voltage generating circuit comprised of a voltage source 120 and resistors 121 and 122. A suitable DC voltage +V is applied to source 120, and this voltage is divided by a voltage divider comprised of resistors 121 and 122 connected in series between source 120 and ground. The output of this voltage divider, defined by the junction of resistors 121 and 122, is connected to the inverting input of amplifier 111. Thus, an offset voltage $V_s$ is applied to amplifier 111. In addition, frequency/voltage converter 125 shown in FIG. 9, although similar to converter 105 of FIG. 3, exhibits the characteristic represented by broken curve b shown in FIG. 4. Thus, converter 125 produces a voltage $E_B$, which is greater than voltage $E_A$, when the frequency of the signal generated by frequency converter 104 is $f_0$, corresponding to a motor speed $\omega_0$. One of ordinary skill in the art will recognize that the circuit components comprising converter 125, such as the filtering elements thereof, can be selected such that the linear portion of the frequency/voltage characteristic extends from $f_s$ to $f'_c$, as shown in FIG. 4.

With the offset voltage $E_S$ applied to the inverting input of amplifier 111, the output voltage produced thereby is proportional to the difference between the speed representing voltage produced by converter 125 and offset voltage $E_s$. Thus, if motor 103 is driven at the speed $\omega_0$, the frequency of the signal generated by frequency generator 104 is equal to $f_0$ and, as shown in FIG. 4, the speed representing voltage produced by converter 125 is equal to $E_B$. By properly selecting the magnitude of the offset voltage, the output voltage produced by amplifier 111 may be expressed as $E_A = E_B - E_s$. It is this output voltage $E_A$ which determines the speed $\omega_0$ at which motor 103 is driven, for example, $\omega_0 = 33\frac{1}{3}$ rpm.

Now, by reason of the offset voltage $E_s$, a negative torque may be produced by the motor. From the characteristic shown in FIG. 4, it is appreciated that, as the speed of motor 103 increases, voltage $E_B$ produced by converter 124 decreases. If the motor speed becomes high enough such that $E_B$ is less than offset voltage $E_s$, then the output voltage $E_A$ produced by amplifier 111 becomes negative. Consequently, the currents supplied to Hall elements 112 and 113, respectively, also are negative. This means that voltages $E_1$ and $E_2$ applied to amplifiers 115 and 116 are negative, and the drive currents supplied by these amplifiers to the stator windings likewise are negative, resulting in a negative torque. This negative torque tends to rapidly return the motor to its desired speed $\omega_0$.

Figure 6:
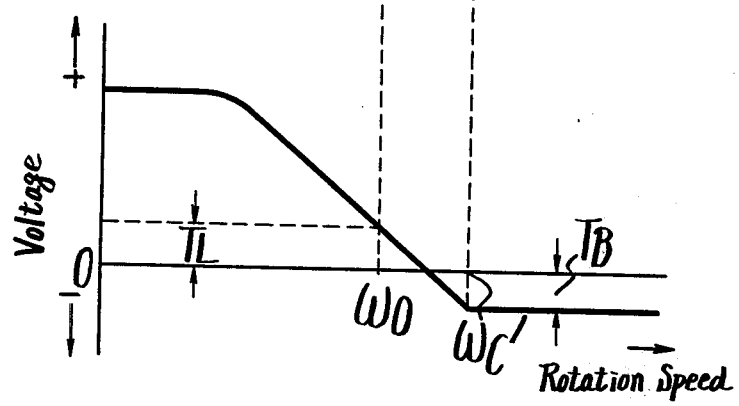
FIG. 6 represents the relation between control voltage and motor speed in accordance with an embodiment of the present invention.

It is recalled that, in the prior art drive circuit shown in FIG. 3, if the actual motor speed exceeds $\omega_c$, the frequency of the signal applied to converter 105 is greater than $f_c$, resulting in a zero voltage at the output of amplifier 111. Thus, in the prior art circuit, direct control to return motor 103 to its desired speed cannot be attained in the event that the speed overshoots the limited control range of converter 105. However, in the embodiment shown in FIG. 9, if the maximum limit to the control range of converter 125 is surpassed, that is, if the speed of motor 103 is high enough such that the frequency of the signal generated by frequency generator 104 is greater than $f'_c$, the output voltage produced by converter 125 is zero, but now the output voltage $E_A$ of amplifier 111 is equal to $-E_s$. In FIG. 6, the torque produced in response to an output voltage from amplifier 111 equal to $-E_s$ is shown as $T_B$. Since $-E_s$ is the maximum negative output voltage produced by amplifier 111 in the event that the motor speed is greater than $\omega'_c$, this negative torque $T_B$ is constant. Nevertheless, this negative torque returns motor 103 rapidly to its desired speed $\omega_0$. That is, contrary to the loss of control over the motor in the event of an overshoot in motor speed which exceeds $\omega_c$, as discussed above with respect to the prior art circuit of FIG. 3, the present invention provides a negative torque to bring the motor rapidly back to its desired speed. Mere frictional forces exerted on the rotor are not relied upon in the circuit shown in FIG. 9 for effecting motor control. Consequently, even if the speed of the motor is abruptly changed, as by selecting a reduced motor speed (for example, from 45 rpm to $33\frac{1}{3}$ rpm), a resultant overshoot in motor speed (as represented in FIG. 7) nevertheless can be rapidly compensated. This is because amplifier 111, when provided with an offset voltage, can produce both positive and negative control voltages for establishing both positive and negative currents through Hall elements 112 and 113.

Another embodiment for providing the aforementioned offset voltage $E_s$ to amplifier 111 is shown in FIG. 10. In this alternative embodiment, the offset voltage is equal to $-E_s$ and is derived from a suitable source 127 of negative DC voltage $-V$ via a voltage divider circuit formed of resistors 123 and 124 connected in series between source 127 and ground. The derived offset voltage $-E_s$ is applied to the non-inverting input of amplifier 111 whereat it is summed with the output voltage produced by converter 125. The converter voltage is shown as being applied to a terminal 126, whereat the summed voltage is represented as $E_B - E_s$. Thus, the alternative embodiment shown in FIG. 10 is similar to the embodiment shown in FIG. 9 in that the output voltage produced by amplifier 111 may be represented as $E_A = E_B - E_s$.

While the present invention has been shown and described with respect to certain preferred embodiments, it will be readily apparent to one of ordinary skill in the art that various changes and modifications in form and details may be made without departing from the spirit and scope of the invention. For example, in the preferred embodiments, the position detectors which detect the position of the rotor are formed of Hall elements. Various alternative embodiments of position detectors can be used, such as photosensors, magnetic sensors, and the like. Furthermore, although the rotor has been assumed to be a two-pole rotor, it should be appreciated that, if desired, the rotor may comprise additional poles formed of permanent magnets. Similarly, the stator windings may include a greater number of phases than those shown herein. As yet another alternative, whereas it has been assumed that the number of Hall elements is equal to the number of stator phases, other combinations can be used. For example, a single Hall element may be used, together with suitable phase shifting circuitry and the like, to control the energization of a plurality of stator phases. It is, therefore, intended that the appended claims be interpreted as including the foregoing, as well as other such changes and modifications.

What is claimed is:

1. A drive circuit for a brushless motor of the type having a rotor magnet and energizable stator windings, said drive circuit comprising:
  position sensing means for sensing the rotary position of said rotor magnet and for generating varying position signals corresponding to said sensed rotary position; and a plurality of amplifier means coupled to said position sensing means and responsive to said position signals to produce drive currents, said amplifier means being coupled to said stator windings to supply said drive currents thereto and each amplifier means including a voltage amplifier stage having a linear gain characteristic for amplifying the position signal applied thereto, a current amplifier stage coupled to said voltage amplifier stage and responsive to said amplified position signal to produce a drive current at an output thereof to supply same to a stator winding, and feedback means interconnected between the output of said current amplifier stage and an input to said voltage amplifier stage, said feedback means including a resistor and a capacitor connected in parallel and operative as a low pass filter circuit to prevent harmonics of the drive current frequency from being transmitted to said stator winding thereby preventing notching in said drive current.

2. The drive circuit of claim 1 wherein said position sensing means comprises a plurality of Hall-effect elements and wherein said stator windings are comprised of plural phases, the number of said Hall-effect elements being determined by the number of phases.

3. The drive circuit of claim 1 wherein said amplifier stage includes a non-inverting input and an inverter input, and said feedback circuit is connected to said inverting input.

4. The drive circuit of claim 3 wherein said position sensing means comprises a plurality of Hall-effect elements, each producing a position signal that is applied across the non-inverting and inverting inputs of a respective amplifier stage.

5. A drive circuit for a brushless motor of the type having a rotor magnet and energizable stator windings, said drive circuit comprising:
   speed sensing means for sensing the speed of said motor and for generating a signal whose frequency varies in accordance with said speed;
   converting means coupled to said speed sensing means for converting the frequency of said signal to a voltage, said converting means having a linear characteristic representing an inverse relation between said frequency and said voltage;
   current supply means for supplying drive currents to said stator windings to determine the torque of said motor;
   means for applying the voltage produced by said converting means to said current supply means to vary said drive currents as a function of the sensed speed of said motor; and
   means for supplying an offset voltage to said voltage applying means such that if the speed of said motor exceeds a predetermined amount, said offset voltage exceeds said converted voltage to modify said drive currents supplied to said stator windings so as to produce an opposite torque in said motor.

6. The drive circuit of claim 5 wherein said means for applying the voltage produced by said converting means to said current supply means comprises an amplifier having a linear gain characteristic; and said means for supplying an offset voltage comprises a source of DC voltage, a voltage divider coupled to said source for producing said offset voltage, and means for coupling said voltage divider to said amplifier to subtract said offset voltage from said converted voltage.

7. The drive circuit of claim 6 wherein said amplifier includes an inverting input and a non-inverting input, said converted voltage being applied to one of said inputs and said voltage divider being coupled to the other input.

8. The drive circuit of claim 6 wherein the polarity of said offset voltage is opposite the polarity of said converted voltage, said offset and converted voltages being applied to a common input of said amplifier.

9. The drive circuit of claim 5 wherein said current supply means comprises a plurality of Hall-effect elements, each adapted to sense the position of the rotor of said motor for generating a varying position signal; and a plurality of amplifier means, each coupled to a respective one of said Hall-effect elements for amplifying said position signal to produce a drive current to be supplied to a stator winding.

10. The drive circuit of claim 9 wherein said means for applying the voltage produced by said converting means to said current supply means comprises an amplifier having a linear gain characteristic for applying said converted voltage to all of said Hall-effect elements so as to modify the position signals generated by the latter as a function of said converted voltage, said offset voltage being applied to said amplifier in opposition to said converted voltage.

11. A drive circuit for a brushless motor of the type having a rotor magnet and energizable stator windings, said drive circuit comprising:
   speed sensing means for sensing the speed of said motor and for generating a signal whose frequency varies in accordance with said speed;
   converting means coupled to said speed sensing means for converting the frequency of said signal to a voltage, said converting means having a linear characteristic representing an inverse relation between said frequency and said voltage;
   position sensing means for sensing the rotary position of said rotor magnet and for generating varying position signals corresponding to said sensed rotary position;
   a plurality of amplifier means coupled to said position sensing means and responsive to said position signals to produce drive currents, said amplifier means being coupled to said stator windings to supply said drive currents thereto and each amplifier means including a voltage amplifier stage having a linear gain characteristic for amplifying the position signal applied thereto, a current amplifier stage coupled to said voltage amplifier stage and responsive to said amplified position signal to produce a drive current at an output thereof to supply same to a stator winding, and feedback means interconnected between the output of said current amplifier stage and an input to said voltage amplifier stage, said feedback means including a resistor and a capacitor connected in parallel;
   means for applying the voltage produced by said converting means to said current supply means to vary said drive currents as a function of the sensed speed of said motor; and
   means for supplying an offset voltage to said voltage applying means such that if the speed of said motor exceeds a predetermined amount, said offset voltage exceeds said converted voltage to modify said drive currents supplied to said stator windings so as to produce an opposite torque in said motor.

* * * * *